United States Patent [19]
Harbert

[11] 3,948,326
[45] Apr. 6, 1976

[54] POWERED LINK DETENT DEVICE

[75] Inventor: Jimmy Don Harbert, Coal Valley, Ill.

[73] Assignee: Deere & Company, Moline, Ill.

[22] Filed: Oct. 24, 1974

[21] Appl. No.: 517,465

[52] U.S. Cl. .................... 172/130; 74/522; 172/469
[51] Int. Cl.² .......................................... A01B 35/32
[58] Field of Search .......... 172/126, 127, 130, 131, 172/204, 228, 229, 230, 456, 469, 473, 488, 489, 494, 668; 74/519, 522, 522.5, 527; 214/768; 254/124

[56] References Cited
UNITED STATES PATENTS

| | | | |
|---|---|---|---|
| 3,139,941 | 7/1964 | Graham et al. | 172/130 |
| 3,428,134 | 2/1969 | Bauman et al. | 172/130 |
| 3,575,242 | 4/1971 | Olsson | 172/130 |
| 3,658,137 | 4/1972 | Seymour et al. | 172/469 X |
| 3,714,991 | 2/1973 | Rieser | 172/130 |
| 3,774,691 | 11/1973 | Oak et al. | 172/130 |

Primary Examiner—Richard C. Pinkham
Assistant Examiner—Richard T. Stouffer

[57] ABSTRACT

A device for alternately restraining movement of each end of a powered extensible and retractable link having first and second sections. The device is contained within a housing which can be inserted into a toolbar and attached to row marker assemblies to alternately lift and lower each row marker. Included as part of the device is a housing having channels therein for guiding linear movement of the link sections, a detent lever for alternately restraining movement of each link section and an actuating mechanism which causes the detent lever to alternately engage and release each link section.

14 Claims, 8 Drawing Figures

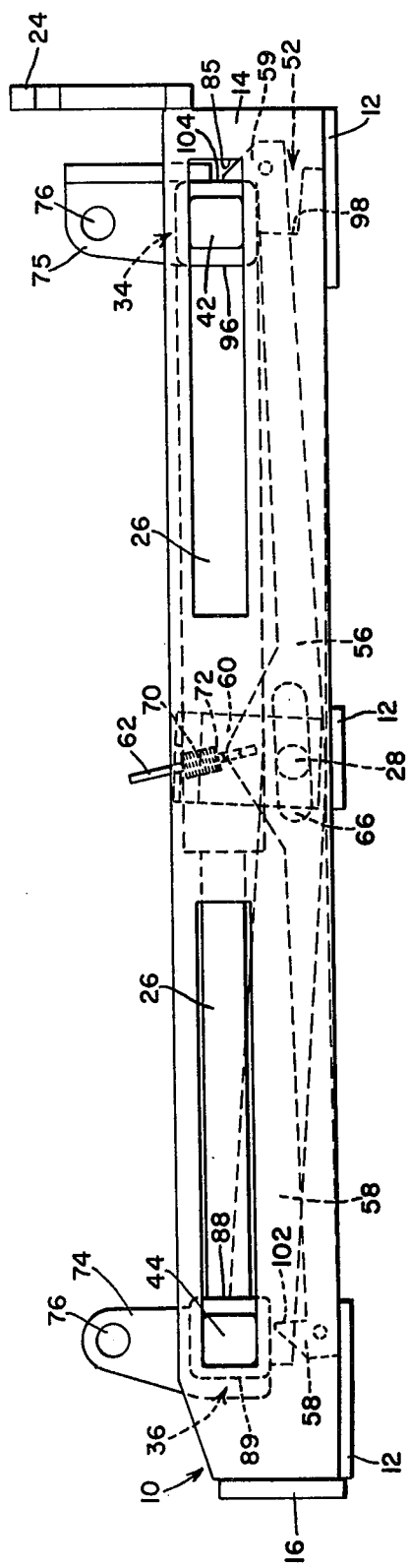
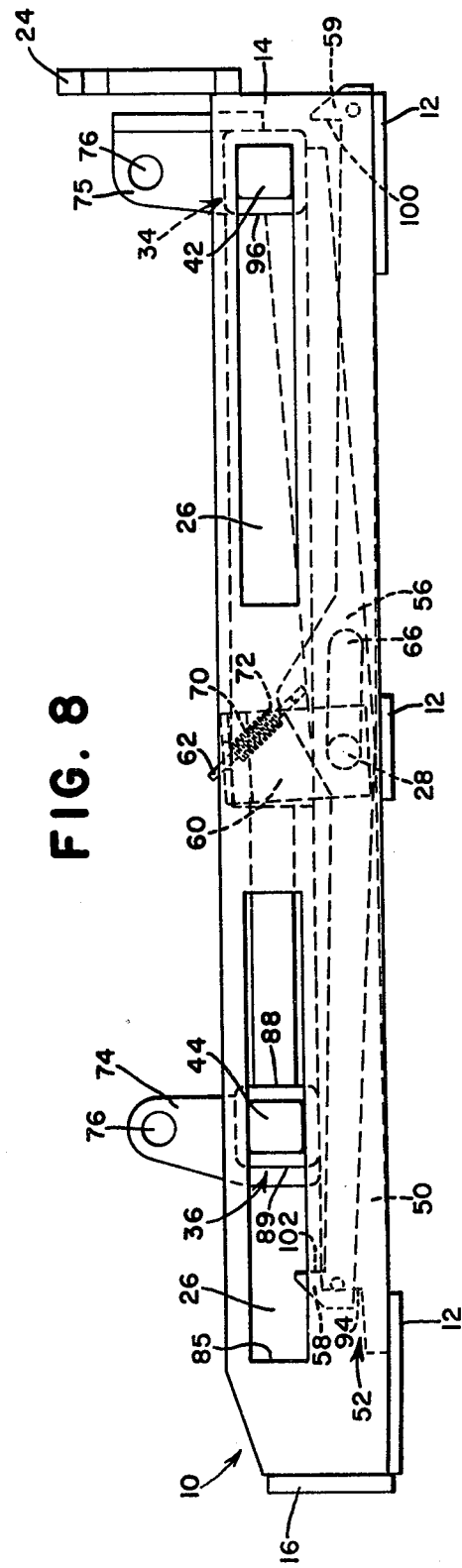

3,948,326

POWERED LINK DETENT DEVICE

BACKGROUND OF THE INVENTION

The present invention relates generally to agricultural planter units, and more particularly relates to row marker lift controls having automatic sequencing mechanisms which alternately cause each row marker to be lifted and lowered.

Automatic row marker lift mechanisms are well known in the art. Those mechanisms employ mechanical as well as electric and hydraulic means to raise and lower the row marker. These mechanisms are mounted on the implements structure or toolbar and include lever members, cable means and other bulky exposed elements that limit the ability to mount tools or other necessary parts on the implement. The mechanisms are exposed to weather, foreign matter and provide moving elements posing safety hazzards. Many mechanisms provide duplicate systems including separate hydraulic lift cylinders that increase cost and maintenance and reduce usable toolbar space.

Actuation of the row marker movement has been tied to tractor movement, planter or grain drill earth engagement, electrical signals, and the hydraulic system.

SUMMARY OF THE INVENTION

It is the principal object of the present invention to provide a simple and yet reliable and inexpensive row marker lift mechanism for a planter or other farm implement.

More specifically, it is proposed to provide a row marker lift mechanism concealed in a housing mounted within the implement toolbar. This mechanism includes a powered extensible and retractable link, and the preferred embodiment utilizes a simple single-acting hydraulic cylinder having each cylinder end slidably engaged in channels of the housing. Each end of the hydraulic cylinder is connected to one row marker lift cable. A detent means is included within the housing and acts to alternately engage and lock each end of the hydraulic cylinder so its respective row marker is held in a raised position. When one end of the single-acting hydraulic cylinder is immovably locked, the other end will be free to float and its respective row marker will be in an operating position. An actuating mechanism serves to cause the detent means to alternately engage and release each end of the hydraulic cylinder as it expands so that its respective row marker is held in a raised position while the other row marker is down and operatively engaging the ground.

BRIEF DESCRIPTION OF THE DRAWINGS

FIG. 7 is a side elevation of the device illustrating the device as the right end of the hydraulic cylinder is being moved to the right.

FIG. 8 is a side elevation of the device illustrating the right end of the link locked and the left end of the link free to move.

DESCRIPTION OF THE PREFERRED EMBODIMENT

Figure 1:
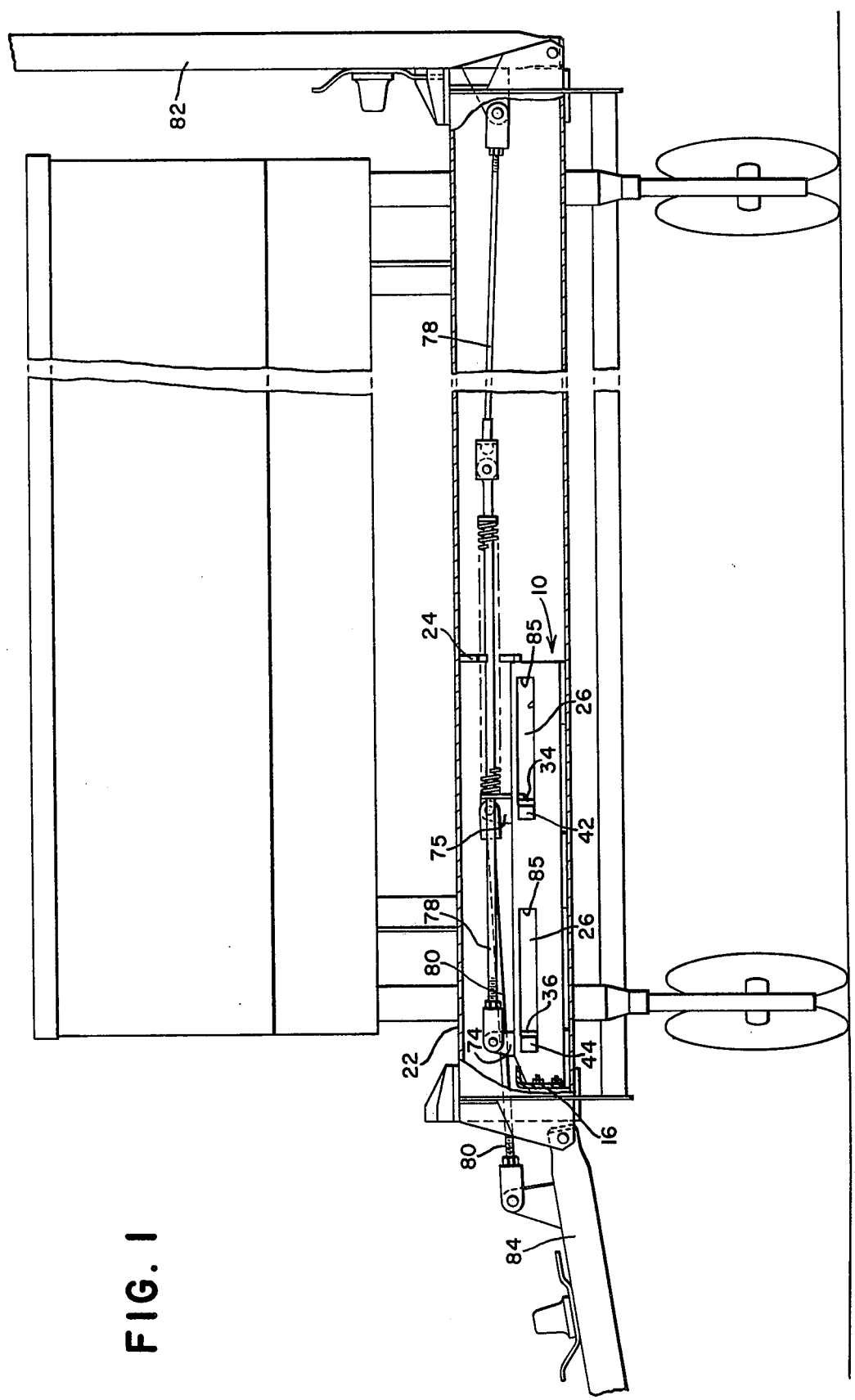
FIG. 1 is a rear view of the device installed within the toolbar of a planter, each end of the link coupled to a row marker assembly.

The restraining device or lift control mechanism is illustrated herein in combination with row markers and a planter unit, see FIG. 1.

The chosen embodiment, while employing a hydraulic cylinder, can also utilize electrical motors or other powered extensible and retractable links. The lift control. mechanism includes a detent lever which alternately restrains movement of each end of the powered link or hydraulic cylinder. Each end of the hydraulic cylinder, when immovably locked by the detent lever, will cause its respective row marker to be held in a raised position. Correspondingly, each row marker will be free to move when its respective hydraulic cylinder end is not so restrained by the detent lever.

Figure 2:
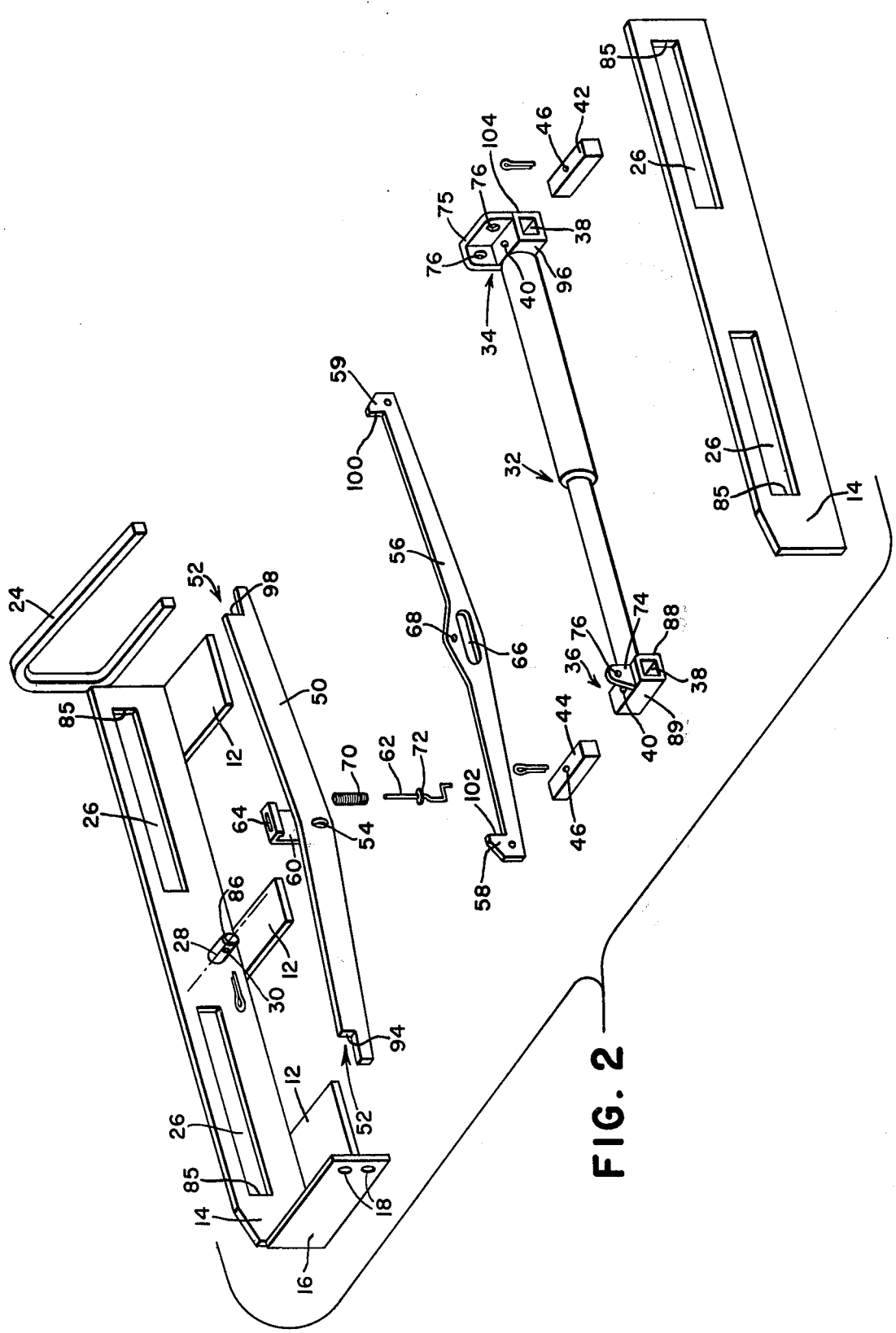
FIG. 2 is an exploded perspective of the device.
Figure 3:
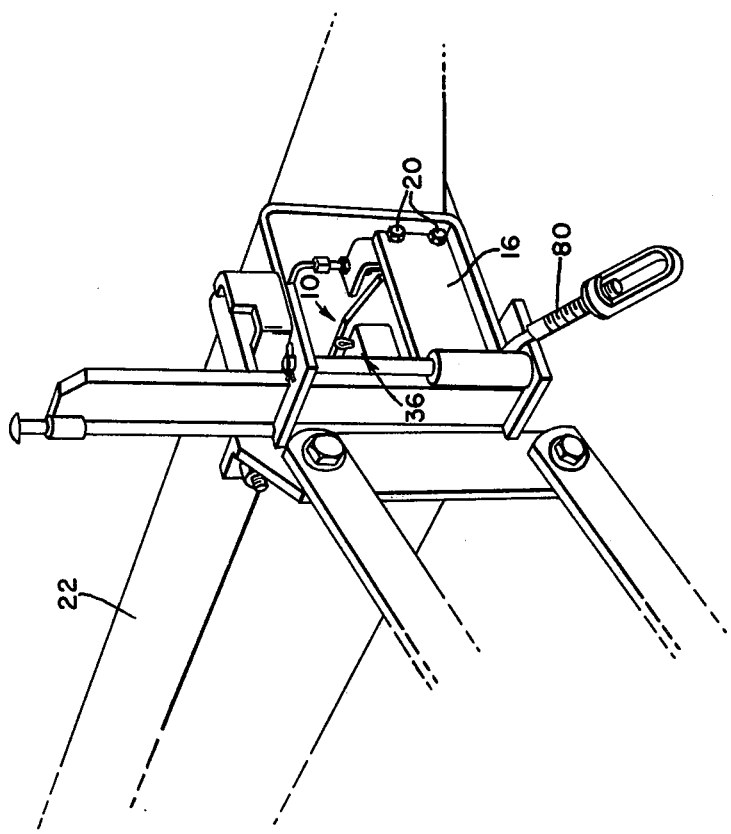
FIG. 3 is an enlarged end view of the device installed within a toolbar.

Referring now to the drawings, and in particular FIG. 1, it can be seen that the device is compact and contained within a rectangularly-shaped housing 10 wherein the extensible and retractable link or hydraulic cylinder is positioned. As shown in FIG. 2, the housing includes base members 12, vertical sides 14 in parallel coplanar relationship with each other, and an end plate 16 secured to one end of the side plates 14. The end plate 16 extends beyond one side plate and includes two openings 18 wherein bolts 20 are positioned to mount the housing 10 within the implement's toolbar 22 as is illustrated in FIG. 3. At the other end of the housing is a brace member 24 which positions the unit within the implement toolbar.

Referring again to FIG. 2, it will be seen that spaced slightly below the upper edge of each housing side plate 14, and extending along the length of each side plate are two sets of rectangularly shaped channel openings 26. To the center portion of one side plate 14 is secured a mounting pin 28 having a hole 30 drilled perpendicular to its center axis.

Within the housing 10 is positioned a single-acting hydraulic cylinder 32. To the cylinder's right or base end is secured a rectangular block, hereafter designated the right block 34. To the cylinder's left or rod end is also secured a rectangular block hereafter designated the left block 36. Each block 34 and 36 has a rectangularly-shaped opening 38 therein perpendicular to the hydraulic cylinder center line. Through the upper surface of each block 34 and 36 is an opening 40. Complementarily shaped guide blocks 42 and 44 with openings 46 perpendicular to their horizontal axis are matingly positioned within their respective hydraulic cylinder block opening 38 and secured thereto by cotter pins.

Figure 4:
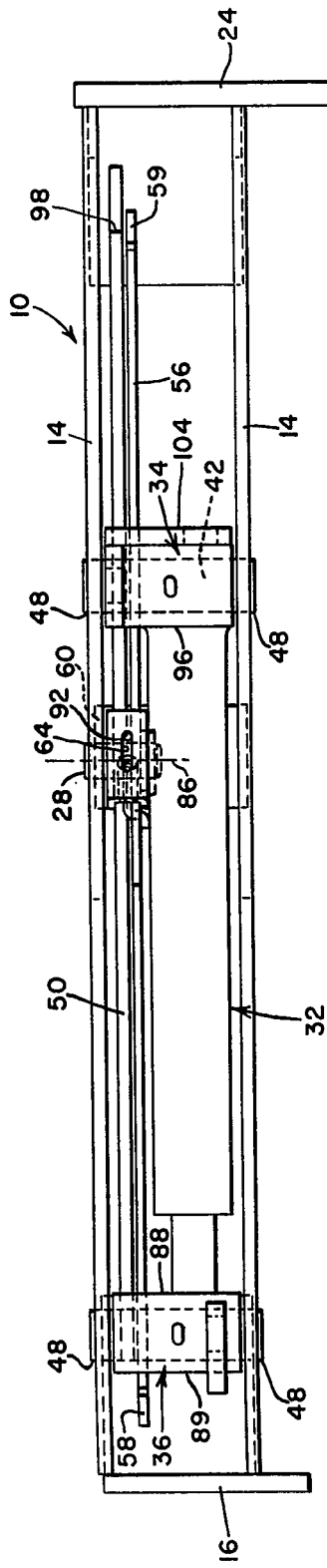
FIG. 4 is a top view of the device.

As is best illustrated in FIG. 4, a portion 48 of each inserted guide block 42 and 44 extends beyond its respective block. Each protruding portion 48 is slidably positioned within a housing channel opening 26 and will move along the path defined by the channel openings 26 in the side plates 14 as the powered link extends or retracts.

Included within the housing 10 is a detent means for alternately restraining inwardly movement of the end portions of the powered link or hydraulic cylinder 32 and an actuating mechanism for causing the detent means to alternately engage and release each end of the link section. The detent means is comprised of an elongated lever member 50 having notched end portions 52 and a circular opening 54. The actuating mechanism includes an elongated lever member 56 having raised or hooked portions 58 at each end, an L-shaped force-transmitting member 60 secured to one side of the center portion of the detent lever 50, and a biasing pin 62 with spring 70 shiftably positioned between the actuating lever 56 and the L-shaped member 60. One leg of the L-shaped force-transmitting member 60 is secured to the center portion of the detent lever 50 and the other leg of said L-shaped member 60 has a slotted opening 64 wherein said biasing pin 62 is shiftably positioned.

Figure 5:
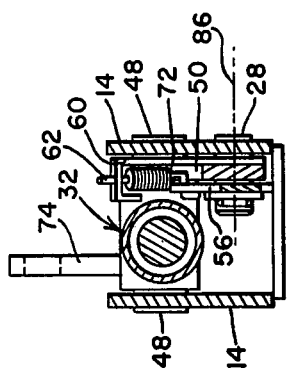
FIG. 5 is an enlarged view of the device taken along lines 5—5 as illustrated in FIG. 6.

The lift control device is compactly assembled within the rectangular housing 10, see FIGS. 4 and 5. As assembled the detent lever 50 is rockably mounted through its hole 54 on the mounting pin 28. This lever 50 is mounted such that the slotted leg of the L-shaped member 60 extends inwardly towards the actuating lever 56 and is positioned horizontal with and parallel to said housing base. The actuating lever 56 is slidably mounted through a slotted opening 66 therein on the same mounting pin 28. To secure the two lever members on the mounting pin 28, a cotter key is inserted through the hole 30 in the mounting pin 28 after the levers 50 and 56 are pivotally mounted.

Figure 6:
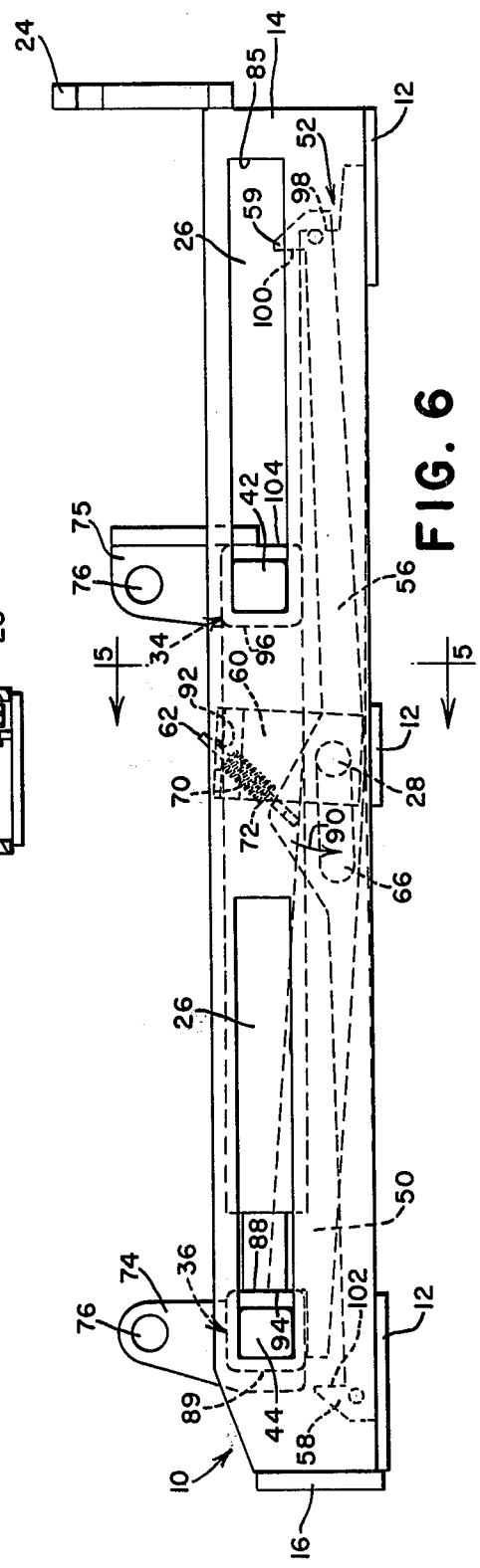
FIG. 6 is a side elevation of the device with the left end of the link locked and the right end of the link free to move.

Referring now to FIG. 6, it will be noted that the biasing pin 62 extends between the actuating lever 56 and the L-shaped member 60. The lower end of the biasing pin 62 is pivotally secured through the circular hole 68 of the actuating lever 56. The upper portion of the biasing pin 62 is shiftably positioned through the slotted opening 64 of the L-shaped member 60. A helical spring 70 is axially aligned with the biasing pin 62 and is positioned around the pin 62. When the biasing pin 62 is secured between the L-shaped member 60 and the actuating lever 56, the spring 70 abutts at its upper end the lower surface of the L-shaped member's horizontal leg, and at its other end the flange 72 of the biasing pin 62.

Secured to the top surface of each hydraulic cylinder block 34 and 36 are upstanding walls 74 and 75, each having openings 76 therein. Through holes 76 are secured the cables 78 and 80 which lift and lower each row marker 82 and 84. As is illustrated in FIG. 1, the cable 78 attached to the hydraulic cylinder left block end 36 lifts and lowers the right row marker 82, and the cable 80 attached to the hydraulic cylinder right block 34 lifts and lowers the left row marker 84.

The lift device functions such that one row marker is locked in the raised transport position when the other row marker is down. As the operator activates the hydraulic system to raise the lowered row marker to a transport position, the locked hydraulic cylinder end block will hold the row marker in a raised position until the lowered marker is raised and locked. At this time the marker originally held is a raised position will be lowered as the detent lever 50 disengages its respective hydraulic cylinder end.

Assuming that the right row marker 82 is raised and the left row marker 84 is lowered, the elements of the restraining device will occupy those positions illustrated in FIG. 6. With the structural elements in these positions, the operation of the device will be as follows. The left block 36 of the hydraulic cylinder is locked between the left end of the detent lever 50 and the housing channel end 85. In this position, the detent lever 50 is rockably disposed clockwise about the pivotal axis 86 of the pin 28 such that its left end is raised and its right end is lowered. The inner face 88 of the hydraulic cylinder left block 36 is abutting the outer surface 94 of the detent lever 50 left end and the outer face 89 of the left block 36 is abutting its respective housing channel outer wall 85.

The actuating lever 56 is positioned to the left and its pivotal axis 86 is located within the right end of the slot 66. Since the actuating lever 56 is as far to the left as it can be moved, the bias pin 62 lower end has been moved to the left of the pivotal axis 86 and the top of bias pin 62 rests on the right edge of the slotted hole 64 in the L-shaped member 60.

An explanation of the forces exerted by the bias pin follows. As the helical spring 70 is compressed between the lower surface of the L-shaped horizontal leg and the bias pin flange 72, a force is transmitted to each surface the bias pin 62 contacts. Accordingly, the bottom of the bias pin transfers a downwardly acting force to the actuating lever 56 at the location where the pin 62 is inserted through the actuating lever 56. Where the parts of the device are in the positions as shown in FIG. 6, a force will be exerted on the actuating lever 56 at a point laterally removed from the lever's pivot axis 86 and a counterclockwise moment force shown by the arrow 90 will be exerted on the actuating lever 56 causing the actuating lever 56 to drop and contact the base plate 12. Thus, as the bias pin 62 exerts the counterclockwise force on the actuating lever 56, the left end of the lever 56 is forced downwardly whereat the hooked end 58 is below the bottom surface of the rectangular portion of the hydraulic cylinder left block 36. Accordingly the actuating lever's 56 right end 59 will be in a raised position. When the bias pin 62 transmits a force to the left on the actuating lever 56, it also transmits a clockwise force to the right portion of the leg of the L-shaped member 60. That force is exerted at the edge 92 of the slotted surface. Since this force is exerted at a point lateral to and at the right of the pivotal axis 86 of the detent lever 50, the detent lever 50 occupies a position clockwise about its pivotal axis 86, whereat its right-hand portion is lowered and its left-hand portion is raised.

With the levers 50 and 56 as above described, the left row marker 84 will be in the lowered position, and the right end 34 of the hydraulic cylinder will be as far to the left as the housing channel 26 permits it to be moved, this situation is illustrated in FIGS. 6, 4 and 1.

Assume now that the operator wants to raise the left row marker 84 and lower the right row marker 82. Accordingly, the right end 34 of the hydraulic cylinder must be extended to raise the left row marker 84 and the left end 36 of the hydraulic cylinder released to permit the right row marker 82 to descend.

To raise the left row marker 84, the operator will actuate the hydraulic system to cause the single-acting hydraulic cylinder 32 to expand. From FIG. 7, it can be seen that as the right end 34 of the hydraulic cylinder moves to the right, the left end 36 of the hydraulic cylinder is prevented from moving to the left by the housing channel wall 85. As the right end 34 of the hydraulic cylinder moves to the right, it slides along the top surface of the levers 56 and 58 and its outer vertical surface 104 will contact the inner vertical surface 100 of the right hooked portion 59 on the actuating lever 56 causing the actuating lever 56 to be slidably moved over the mounting pin 28 to the right. As this actuating lever 56 slides to the right, the top of its left end raised or hooked portion 58 will be lower than the bottom of the hydraulic cylinder left block 36. As the acutating lever member 56 is slidably moved over the mounting pin 28 and crosses its center balance point, the lower end of the bias pin 62 is moved to the right of the pivotal axis 86, the helical spring 70 is compressed and the top of the biased pin 62 shiftably forced to the left end of the slotted opening 64 in the horizontal leg of the L-shaped member 60 (see FIG. 8). The forces now exerted by the bias pin 62 on the actuating lever 56 and detent lever 50 are reversed from those forces which prevailed when the restraining device was as illustrated in FIG. 6 and consequently the actuating lever 56 will tend to rotate clockwise and the detent lever 50 will tend to rotate counterclockwise. However, as shown in FIG. 7, counterclockwise rotation of the detent lever 50 does not occur until the inner vertical surface 96 of the right block 34 of the hydraulic cylinder has moved beyond the vertical face 98 of the detent lever 50.

After the right block 34 has moved to the right, the detent lever 50 rotates counterclockwise, and its left end will drop downwardly, thereby disengaging the hydraulic cylinder left end 36 whereby gravity will cause the right row marker to descend and the left block 36 to slidably move to the right. Meanwhile, the actuating lever left hooked portion 58 has, as the hydraulic cylinder left end rectangular block 36 passed over it, emerged at the left of the sliding hydraulic cylinder left block 36 and its right end 59 will rotate downwardly disengaging the outer side 104 of the hydraulic cylinder right block 34. The hydraulic cylinder right block 34 is now immovably locked and prevented from moving to the left by the detent lever's right end vertical surface 98, and is also prevented from moving to the right since it has reached the end of the housing channel 26. At this time the left row marker 84 is raised and the right row marker 82 is descending since the left end of the hydraulic cylinder is able to slidably move to the right. The right row marker 82 is now operational and the left end of the single-acting hydraulic cylinder can "float" to allow the right row marker 82 to move up or down to follow varying ground contours.

I claim:

1. In combination with a powered extensible and retractable link having movable first and second sections, a device for alternately restraining movement of said first and second sections of said link, comprising: a guide means for linearly defining and confining movement of said link sections; a detent means alternately registrable with each of said link sections to limit movement of that section in register; and an actuating means for the detent means movable by said first and second link sections during the defined and confined movement of said sections, during which movement said sections move said actuating means to respective first and seccond positions thereof, which actuating means when in said first position does cause said detent means to register with said first link section to limit movement of said first link section, and when in said second position does cause said detent means to register with said second link section to limit movement of said second link section.

2. The invention defined in claim 1 in which the guide means includes a rectangularly shaped housing having channels therein, said link sections being operatively engaged with said channels for linearly reversible movement therein.

3. The invention defined in claim 2 in which said link sections have end portions adapted for slidable movement within said housing channels.

4. The invention defined in claim 1 in which the powered extensible and retractable link is a single-acting hydraulic cylinder.

5. The invention defined in claim 1 in which the detent means includes a lever rockably secured adjacent said powered link, each end of said lever being engageable with one link section to restrain linear movement of that link section alternately.

6. The invention defined in claim 5 in which the lever has notched end portions which alternately engage, retain and disengage each end portion of said link section.

7. The invention defined in claim 1 in which the actuating mechanism includes an actuating lever in spaced apart relation to said link and said detent means; said lever being laterally shiftable by said link sections as said sections expansively move; a force-transmitting member secured to said detent means; a biasing means having a first portion pivotally attached to said actuating lever and a second portion shiftably coupled with said force-transmitting means, said biasing means being shiftable by said actuating lever between a first position in which it exerts forces on said actuating lever and said force-transmitting means causing said actuating lever to rotate clockwise and said force-transmitting member and its detent means to rotate counterclockwise and in a second position in which it causes said actuating lever to rotate counterclockwise and said force-transmitting member and detent means to rotate clockwise.

8. The invention defined in claim 7 in which the actuating lever has hooked ends projecting therefrom for matingly engaging said link section end portions to shiftably move said lever as said link sections expansively move.

9. The invention defined in claim 7 in which the force-transmitting member is L-shaped, one leg thereof secured to said detent means center portion, the other leg thereof extending over said actuating lever and having a slotted opening therein wherein said biasing means second portion is shiftably positioned.

10. The invention defined in claim 7 in which the biasing means includes: a force-transmitting pin having a flange thereon, and one end of said pin is pivotally mounted in said actuating lever and the other end of said pin is shiftably supported by said force-transmitting member; and a helical spring co-axially aligned with said pin and compressibly positioned between said force-transmitting member and said pin flange.

11. In combination with a powered extensible and retractable link having first and second sections, a device for alternately restraining movement of said first and second sections of said link, comprising: a rectangularly shaped housing having guide channels on two opposite sides thereof; said link being a single-acting hydraulic cylinder positioned adjacent said housing, and having outer sections adapted for slidable engagement with said channel guides for reversible linear movement therein; a pin secured to and perpendicular to one inner wall of said housing; a detent lever having notched end portions, rockably secured to said housing and adjacent said hydraulic cylinder, said notched end portions operable to engage and retain or disengage their respective slidable outer sections of said hydraulic cylinder to prevent reversed linear movement; an actuating lever having hooked end portions and a slotted opening therein, said lever being shiftably secured through said slotted opening to said housing, parallel with and adjacent said detent lever, with said powered link sections during extension thereof abutting said lever hooked end portions to shiftably move said actuating lever; an L-shaped force-transmitting member, one leg thereof secured to said detent lever center portion, the other leg thereof extending towards said actuating lever and having a slotted opening therein; a biasing means including a force-transmitting pin having a flange thereon, one end thereof pivotally secured to said shiftable actuating lever and the other end thereof shiftably positioned through said opening of said L-shaped member; and a helical spring co-axially aligned with said pin and compressibly positioned between said force-transmitting member and said pin flange.

12. The invention defined in claim 1 in which said device is mountably positioned within the toolbar of an implement, said implement having a row marker assembly at each end thereof, and each link section is connected to one row marker assembly so as to cause said row markers to alternately lift and lower.

13. In a farm implement having a toolbar and a pair of elongated row marker devices projecting outwardly of and pivotally mounted on the toolbar at opposite ends thereof so as to swing vertically between raised and ground-engaging positions, the improvement residing in: an extensible and retractable hydraulic motor having a cylinder and ram with abutment means on their distal ends respectively, said motor being supported in the toolbar and restrained against movement except for axial movement of the cylinder and ram respectively; a lever substantially the length of the motor when the cylinder and ram are extended, said lever being positioned alongside the motor and having opposite end portions engageable with the abutment means on the ram and cylinder respectively; means rockably mounting the lever on the tool-bar to shift between a first position in which one end portion thereof engages its respective abutment means and the other end portion is out of engagement with its respective abutment means, and a second position in which said one end portion is out of engagement with its respective abutment means and said other end is in engagement with its respective abutment means; means responsive to extension of the hydraulic motor and connected to the lever for shifting the latter between said first and second position, said shifting occurring co-incident with the abutment means passing adjacent their respective end portions during the extension stroke of said motor; and means connecting the ram to one and the cylinder to the other of the row marker devices.

14. In a farm implement having a toolbar and a pair of elongated row marker devices projecting outwardly of and pivotally mounted on the toolbar at opposite ends thereof so as to swing vertically between raised and ground-engaging positions, the improvement residing in: an extensible and retractable hydraulic cylinder and ram supported in the toolbar and restrained against movement except for axial movement thereof; a lever substantially the length of the cylinder and ram when extended, said lever being positioned alongside the motor and having opposite end portions engageable with the distal ends of the ram and cylinder respectively; means rockably mounting the lever on the toolbar to alternately shift between a first position in which one end portion thereof engages the distal end of the ram and the other end portion is out of engagement with the distal end of the cylinder, and a second position in which said one end portion is out of engagement with the distal end of the ram and said other end is in engagement with the distal end of the cylinder; means responsive to extension of the hydraulic cylinder and ram and connected to the lever for shifting the latter between said first and second position, said shifting occurring co-incident with the respective distal ends passing adjacent their respective end portions during the extension of said cylinder and ram; and means connecting the ram to one and the cylinder to the other of the row markers.

* * * * *